(12) United States Patent
Tong

(10) Patent No.: US 12,172,901 B2
(45) Date of Patent: Dec. 24, 2024

(54) METHOD FOR CONTINUOUSLY PRODUCING GRAPHENE AEROGEL MICROSPHERES

(71) Applicant: Zhongsu New Technologies Company Limited, Beijing (CN)

(72) Inventor: Shanghui Tong, Beijing (CN)

(73) Assignee: Zhongsu New Technologies Company Limited, Beijing (CN)

(*) Notice: Subject to any disclaimer, the term of this patent is extended or adjusted under 35 U.S.C. 154(b) by 603 days.

(21) Appl. No.: 17/597,138

(22) PCT Filed: Mar. 20, 2020

(86) PCT No.: PCT/CN2020/080336
§ 371 (c)(1),
(2) Date: Dec. 27, 2021

(87) PCT Pub. No.: WO2020/258932
PCT Pub. Date: Dec. 30, 2020

(65) Prior Publication Data
US 2022/0267154 A1     Aug. 25, 2022

(30) Foreign Application Priority Data
Jun. 27, 2019   (CN) .......................... 201910567189.5

(51) Int. Cl.
*C01B 32/184*     (2017.01)
*C01B 32/194*     (2017.01)
*C01B 32/198*     (2017.01)

(52) U.S. Cl.
CPC .......... *C01B 32/184* (2017.08); *C01B 32/194* (2017.08); *C01B 32/198* (2017.08); *C01P 2004/03* (2013.01); *C01P 2004/32* (2013.01)

(58) Field of Classification Search
CPC ... C01B 32/184; C01B 32/194; C01B 32/198; C01P 2004/03; C01P 2004/32
See application file for complete search history.

(56) References Cited

FOREIGN PATENT DOCUMENTS

| CN | 105195067 A | 12/2015 |
|---|---|---|
| CN | 105633360 A * | 6/2016 |

(Continued)

OTHER PUBLICATIONS

International Search Report issued issued in Application No. PCT/CN2020/080336, mailed on Jun. 11, 2020 (5 pages).

(Continued)

*Primary Examiner* — Robert S Jones, Jr.
*Assistant Examiner* — Jiangtian Xu
(74) *Attorney, Agent, or Firm* — Osha Bergman Watanabe & Burton LLP

(57) ABSTRACT

Provided is a method for continuously producing graphene aerogel microspheres, including mixing graphene oxide and water to form a graphene oxide dispersion, mixing the dispersion and an alkali metal hydroxide, and ultrasonically dispersing the mixture to obtain a liquid crystal solution of graphene oxide; placing the liquid crystal solution into a slurry supply apparatus, and pressurizing the slurry supply apparatus by a pressure supply apparatus while feeding the liquid crystal solution into a calcium chloride coagulation bath by a splitter, to obtain graphene oxide microspheres; placing the graphene oxide microspheres into a solution of sodium ascorbate, and letting the reaction proceed to obtain wet gel microspheres of graphene; and treating the wet gel microspheres of graphene to obtain graphene aerogel microspheres.

10 Claims, 2 Drawing Sheets

(56) References Cited

FOREIGN PATENT DOCUMENTS

| CN | 105645404 A | * | 6/2016 |
|---|---|---|---|
| CN | 105498649 B | | 12/2017 |
| CN | 109289774 A | | 2/2019 |
| CN | 110181874 A | | 8/2019 |
| CN | 110181875 A | | 8/2019 |
| CN | 110203909 A | | 9/2019 |
| CN | 110255539 A | | 9/2019 |
| CN | 110281598 A | | 9/2019 |

OTHER PUBLICATIONS

Written Opinion issued in International Application No. PCT/CN2020/080336, mailed on Jun. 11, 2021 (4 pages).

* cited by examiner

METHOD FOR CONTINUOUSLY PRODUCING GRAPHENE AEROGEL MICROSPHERES

TECHNICAL FIELD OF THE DISCLOSURE

The present disclosure relates to a method for continuously producing graphene aerogel microspheres.

BACKGROUND OF THE DISCLOSURE

Graphene aerogel, due to its unique properties (e.g., ultralow density, superelasticity, and high surface area), has attracted great attention. Graphene aerogel has many potential applications in energy devices, sensors, pollutant adsorbents and thermal insulation materials.

Current reports on graphene aerogels are largely on the individual ones. In practical applications, however, a large number of graphene aerogels of any shape and size usually need to be collected. Traditional aerogels have pore structures on both the inner and outer surfaces. A large number of gathered graphene aerogels would exhibit the group effect and be prone to agglomerate and break. Graphene aerogel blocks are directly applicable to thermal insulation materials, adsorbent materials, and other fields. During the preparation of large blocks of graphene aerogels, however, they have such problems as insufficient reduction, difficulty in cleaning, and long drying time. Since large blocks of graphene aerogels comprise impurities left over by incomplete cleaning, graphene aerogels are prone to defects that affect their performance. Graphene aerogel microspheres, due to their small particle size, are basically free from the problems during their preparation that occur in the reduction, cleaning, freezing, and drying of graphene aerogel blocks. However, the continuous production of graphene aerogel microspheres is still a difficult job.

CN105498649B, for example, discloses a method for preparing composite aerogel microspheres of graphene nanoparticles. The method comprises preparing graphite oxide from natural graphite, mixing deionized water, graphite oxide, nanoparticles uniformly, ultrasonically treating the mixture to obtain an aqueous dispersion of graphene oxide nanoparticles, atomizing the dispersion into droplet microspheres of graphene oxide nanoparticles while collecting the droplet microspheres by a receiving liquid in a cooling bath, filtering the receiving liquid to obtain ice microspheres of graphene oxide nanoparticles, freeze-drying the ice microspheres to obtain composite aerogel microspheres of graphene oxide nanoparticles, and subjecting the composite aerogel microspheres of graphene oxide nanoparticles to thermal reduction or chemical reduction to obtain composite aerogel microspheres of graphene nanoparticles. CN105195067A discloses a method for preparing graphene aerogel microspheres. The method comprises preparing graphite oxide from natural graphite; preparing an aqueous dispersion of graphene oxide; atomizing the aqueous dispersion into droplet microspheres of graphene oxide by a spray method while collecting the droplet microspheres by a receiving liquid in a cooling bath, filtering the receiving liquid to obtain ice microspheres of graphene oxide, freeze-drying the ice microspheres to obtain aerogel microspheres of graphene oxide, and subjecting the aerogel microspheres of graphene oxide to thermal reduction to obtain graphene aerogel microspheres. The methods described above are suitable for the production of graphene aerogel microspheres on a lab scale and inferior in production continuity.

SUMMARY OF THE DISCLOSURE

In view of the above, an objective of the present disclosure is to provide a method for producing graphene aerogel microspheres that is suitable for continuous mass production. Further, the method of the present disclosure makes it possible to obtain graphene aerogel microspheres having a shell structure. The present disclosure accomplishes the objectives described above by technical solutions described hereinafter.

Provided is a method for continuously producing graphene aerogel microspheres, which comprises:

(1) mixing graphene oxide and water to form a graphene oxide dispersion in which the concentration of graphene oxide is 3-20 mg/ml, mixing the dispersion and an alkali metal hydroxide, and ultrasonically dispersing the mixture to obtain a liquid crystal solution of graphene oxide;

(2) placing the liquid crystal solution into a slurry supply apparatus, and pressurizing the slurry supply apparatus by a pressure supply apparatus while feeding the liquid crystal solution into a calcium chloride coagulation bath by a splitter, to obtain graphene oxide microspheres after a standstill of 5-30 min;

(3) placing the graphene oxide microspheres into a solution of sodium ascorbate, and letting the reaction proceed at 60-90° C. for 5-25 hr, to obtain wet gel microspheres of graphene; and (4) treating the wet gel microspheres of graphene to obtain graphene aerogel microspheres.

According to the method of the present disclosure, it is preferable, in step (1), that the concentration of graphene oxide in the graphene oxide dispersion is 5-10 mg/ml, and that the alkali metal hydroxide is 0.1-3 wt % of the weight of the graphene oxide dispersion.

According to the method of the present disclosure, it is preferable, in step (1), that ultrasonically dispersing the mixture continues for 3-15 min.

According to the method of the present disclosure, it is preferable, in step (2), that the slurry supply apparatus is pressured by the pressure supply apparatus to a pressure of 0.01-0.05 MPa.

According to the method of the present disclosure, it is preferable, in step (2), that the number of the splitters is two or more, the splitter has two or more outlets, and the outlet has a diameter of 1-5 mm.

According to the method of the present disclosure, it is preferable, in step (2), that the calcium chloride coagulation bath includes an aqueous solution of calcium chloride the concentration of which is 1-8 wt %.

According to the method of the present disclosure, it is preferable, in step (3), that the concentration of sodium ascorbate in the solution of sodium ascorbate is 3-15 g/l.

According to the method of the present disclosure, it is preferable, in step (4), that treating the wet gel microspheres of graphene comprises a washing step in which the wet gel microspheres of graphene are washed with an aqueous solution of ethanol the concentration of which is 0.5-10 wt %, for 10-36 hr to obtain washed microspheres.

According to the method of the present disclosure, it is preferable, in step (4), that treating the wet gel microspheres of graphene further comprises a freezing step in which the washed microspheres are frozen at −10° C. to −40° C. for 5-15 hr, and thawed at 15-35° C. to obtain thawed microspheres.

According to the method of the present disclosure, it is preferable, in step (4), that treating the wet gel microspheres of graphene further comprises a step of drying under atmospheric pressure in which the thawed microspheres are dried under atmospheric pressure and at 25-60° C.

The present disclosure obtains a solution of orderly liquid crystal of graphene oxide by mixing an alkali metal hydroxide and a graphene oxide dispersion, prepares wet gel microspheres of graphene by a wet spinning technique, and obtains graphene aerogel microspheres by an atmospheric pressure drying technique. Such a method makes continuous mass production possible. By means of the preferred technical solutions of the present disclosure, the method of the present disclosure makes it possible to obtain graphene aerogel microspheres having a shell structure.

Figure 1:
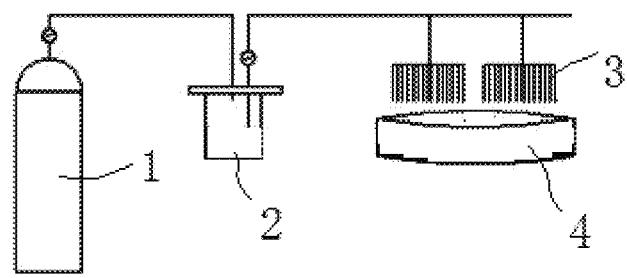
FIG. 1 is a schematic diagram of an apparatus used by the present disclosure to produce graphene aerogel microspheres.

In the drawings accompanying the specification, the reference numeral "1" denotes a pressure supply apparatus, "2" represents a slurry supply apparatus, "3" denotes a splitter, and "4" denotes a container.

DETAIL DESCRIPTION OF THE DISCLOSURE

The following is a further description of the present disclosure by means of embodiments, but the present disclosure is not limited to those embodiments.

The method for producing graphene oxide aerogel microspheres according to the present disclosure comprises: (1) a step of preparing a liquid crystal solution; (2) a step of preparing graphene oxide microspheres; (3) a step of preparing wet gel microspheres; and (4) a step of preparing graphene aerogel microspheres. The following is a detailed description of the method.

<Step of Preparing Liquid Crystal Solution>

Graphene oxide and water are mixed to form a graphene oxide dispersion. No particular limitation is needed for the order of mixing them. According to one embodiment of the present disclosure, graphene oxide is added to water to form the graphene oxide dispersion. According to another embodiment of the present disclosure, water is added to graphene oxide to form the graphene oxide dispersion. The concentration of graphene oxide in the graphene oxide dispersion may be 3-20 mg/ml, preferably 5-10 mg/ml, and more preferably 5-8 mg/ml. This helps to improve the shell structure of the resulting graphene aerogel.

The graphene oxide dispersion and an alkali metal hydroxide are mixed and ultrasonically dispersed to obtain a liquid crystal solution of graphene oxide. No particular limitation is needed for the order of mixing them. According to one embodiment of the present disclosure, the alkali metal hydroxide is added to the graphene oxide dispersion to form the graphene oxide dispersion. According to another embodiment of the present disclosure, the graphene oxide dispersion is added to the alkali metal hydroxide to form the graphene oxide dispersion. The alkali metal hydroxide may be potassium hydroxide or sodium hydroxide, preferably potassium hydroxide. The alkali metal hydroxide may be used in the form of a solid powder or in the form of an aqueous solution. The alkali metal hydroxide is 0.1-3 wt %, preferably 0.2-2 wt %, and more preferably 0.5-1 wt %, of the weight of the graphene oxide dispersion. The duration for the ultrasonic dispersion is 3-20 min, preferably 5-15 min, and more preferably 5-10 min. This helps to improve the shell structure of the resulting graphene aerogel. According to one embodiment of the present disclosure, in step (1), the concentration of graphene oxide in the graphene oxide dispersion is 5-10 mg/ml, and the alkali metal hydroxide is 0.1-3 wt % of the weight of the graphene oxide dispersion.

<Step of Preparing Graphene Oxide Microspheres>

The liquid crystal solution of graphene oxide is placed into a slurry supply apparatus. While the slurry supply apparatus is pressurized by a pressure supply apparatus, the liquid crystal solution is fed into a calcium chloride coagulation bath by a splitter. After a standstill of 5-30 min, graphene oxide microspheres result. This helps the production to be continuous. No particular limitation is needed for the slurry supply apparatus. It may be, for example, a slurry tank. The pressure supply apparatus may be an inert gas pressure bottle or an air compressor. The slurry supply apparatus is pressurized by the pressure supply apparatus such as to be under a pressure of 0.01-0.05 MPa. The number of the splitters is two or more, preferably three or more, and more preferably five or more. The number of outlets of the splitter is two or more, preferably 5-100, and more preferably 10-50. The diameter of the outlet is 1-5 mm, preferably 2-3 mm.

The calcium chloride coagulation bath is in an excessive amount, which helps in the coagulation and orderly arrangement of the liquid crystal of graphene oxide. The calcium chloride coagulation bath may be an aqueous solution of calcium chloride, in which the concentration of calcium chloride is 1-8 wt %, preferably 2-7 wt %, and more preferably 3-5 wt %. The liquid crystal solution of graphene oxide is fed into the calcium chloride coagulation bath by the splitter, followed by a standstill of 5-30 minutes, preferably 10-25 minutes, and more preferably 15-20 minutes. This helps the liquid crystal to coagulate and form microspheres. As a result of the standstill, the microspheres sink to the bottom of the container containing the calcium chloride coagulation bath. Graphene oxide microspheres are obtained after the calcium chloride coagulation bath is discarded and a large amount of deionized water is added to the container to wash the sediment.

<Step of Preparing Wet Gel Microspheres>

The graphene oxide microspheres are placed into a solution of sodium ascorbate, and the reaction proceeds at 60-90° C. for 5-25 hr, to obtain wet gel microspheres of graphene. The temperature of the reaction may be 60-90° C., preferably 65-85° C., and more preferably 70-80° C. The duration of the reaction time may be 5-20 hr, preferably 8-15 hr, more preferably 9-12 hr. This takes into account both the production efficiency and the formation of the shell structure.

The concentration of sodium ascorbate in the solution of sodium ascorbate is 3-15 g/l, preferably 3.5-8 g/l, and more preferably 4-7 g/l. This helps to improve the shell structure of the resulting graphene aerogel.

<Step of Preparing Graphene Aerogel Microspheres>

The wet gel microspheres of graphene are treated to obtain graphene aerogel microspheres. Treating the wet gel microspheres of graphene comprises a washing step, a freezing step, a step of drying under atmospheric pressure, and the like.

In the washing step, the wet gel microspheres of graphene are washed with an aqueous solution of ethanol for 10-36 hr to obtain washed microspheres. The concentration of the aqueous solution of ethanol may be 0.5-10 wt %, preferably 0.6-5 wt %, and more preferably 1-2 wt %. This helps the product to have a stable quality and the production to be continuous.

In the freezing step, the washed microspheres are frozen at −10° C. to −40° C. for 5-15 hr, and thawed at 15-35° C. to obtain thawed microspheres. The temperature of freezing the washed microspheres may be −10° C. to −40° C., preferably −15° C. to −35° C., and more preferably −20° C. to −25° C. The duration for freezing the washed microspheres may be 5-15 hr, preferably 8-13 hr, and more preferably 10-12 hr. The frozen wet gel microspheres of graphene are thawed at 15-35° C., preferably 16-30° C., and more preferably 20-25° C.

In the step of drying under atmospheric pressure, the thawed microspheres are dried under atmospheric pressure and at 25-60° C. Atmospheric pressure is approximately equal to 1 atm. The temperature of drying the thawed microspheres is 25-60° C., preferably 28-50° C., and more preferably 30-35° C.

According to one embodiment of the present disclosure, the wet gel microspheres of graphene are washed alternately with an aqueous solution of ethanol and water for 10-36 hr to obtain washed microspheres; the washed microspheres are frozen at −10° C. to −40° C. for 5-15 hr, and thawed at 15-35° C. to obtain thawed microspheres; and the thawed microspheres are dried under atmospheric pressure and at 25-60° C.

The graphene aerogel microspheres prepared by the method of the present disclosure have a shell structure, a porous structure inside of the shell, and a thermal conductivity of 0.02-0.05 W/(m·k). The surface of the shell of the graphene aerogel microsphere is dense and rigid, and the inside of the shell is a porous, elastic structure. So, the graphene aerogel microspheres have high strength and compression resilience.

The following is a description of methods used to test the graphene aerogel microspheres prepared in examples that will be described later.

Thermal Conductivity

The thermal conductivity of a particle or powder sample is measured by a transient hot-wire method, specifically by referring to GB/T 10297-2015 (*Test of Thermal Conductivity of Nonmetal Solid Materials—Hot-wire Method*). The sample is evenly loaded into sample boxes, and a wire of heat source is placed between two sample boxes, with the wire of heat source being in direct contact with the sample.

Fire Rating

The combustion performance of a sample is measured by referring to GB/T 8624-2012 (*Classification for Burning Behavior of Building Materials and Products*).

Density Test

Density herein refers to the free flowing bulk density of a sample. A known amount of a sample is caused to fall freely through a funnel from a certain height until it loosely fills a container. The free-flowing bulk density of the sample is calculated by dividing the mass of the sample by the volume it fills. The average of at least three measurements is taken as the final result.

Particle Size

The particles are randomly sampled and measured using a vernier caliper.

EXAMPLE 1

(1) Graphene oxide was dispersed in 10,000 ml of deionized water to obtain a graphene oxide dispersion the concentration of which was 5 mg/ml. 56 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.02 MPa, the liquid crystal solution was fed into container 4 containing a calcium chloride coagulation bath (an aqueous solution of calcium chloride in a concentration of 5 wt %) by splitters 3 (the number of which is three and each of which has 10 outlets having a diameter of 2 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

Figure 2:
FIG. 2 shows a photograph of graphene aerogel microspheres.
Figure 3:
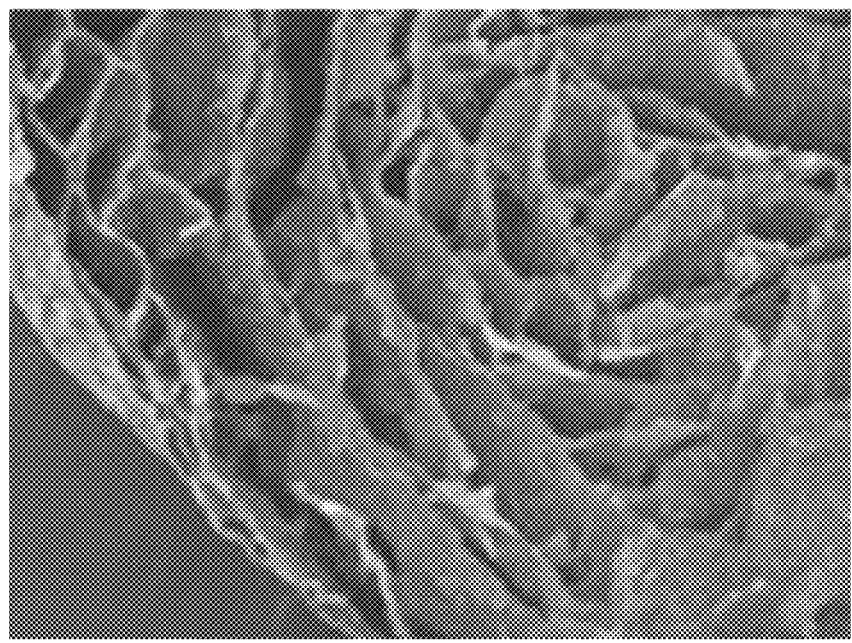
FIG. 3 shows a scanning electron microscopy (SEM) image of graphene aerogel microspheres.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres. See FIGS. 2 and 3 for a photograph and an SEM image of the graphene aerogel microspheres.

The production method described above was carried out for five successive days, and quality stability between batches of the products was observed.

EXAMPLE 2

(1) Graphene oxide was dispersed in 10,000 ml of deionized water to obtain a graphene oxide dispersion the concentration of which was 6 mg/ml. 56 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.02 MPa, the liquid crystal solution was fed into container 4 containing a calcium chloride coagulation bath (an aqueous solution of calcium chloride in a concentration of 5 wt %) by splitters 3 (the number of which is two and each of which has 10 outlets having a diameter of 2 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres.

The production method described above was carried out for five successive days, and quality stability between batches of the products was observed.

EXAMPLE 3

(1) Graphene oxide was dispersed in 10,000 ml of deionized water to obtain a graphene oxide dispersion the concentration of which was 8 mg/ml. 80 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.02 MPa, the liquid crystal solution was fed into container 4 containing a calcium chloride coagulation bath (an aqueous solution of calcium chloride in a concentration of 5 wt %) by splitters 3 (the number of which is two and each of which has 10 outlets having a diameter of 2 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres.

The production method described above was carried out for five successive days, and quality stability between batches of the products was observed.

The graphene aerogel microspheres prepared in Examples 1 to 3 were tested, and the results are shown in Table 1.

TABLE 1

| Example No. | Thermal Conductivity (W/(m · k)) | Particle Diameter (mm) | Density (mg/ml) | Fire Rating |
| --- | --- | --- | --- | --- |
| 1 | 0.030 | 2 | 6 | A |
| 2 | 0.031 | 2 | 7 | A |
| 3 | 0.032 | 2 | 9 | A |

EXAMPLE 4

(1) Graphene oxide was dispersed in 100 ml of deionized water to obtain a graphene oxide dispersion the concentration of which was 5 mg/ml. 0.56 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.01 MPa, the liquid crystal solution was fed into container 4 containing a calcium chloride coagulation bath (an aqueous solution of calcium chloride in a concentration of 5 wt %) by splitters 3 (the number of which is three and each of which has 10 outlets having a diameter of 3 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres.

EXAMPLE 5

(1) Graphene oxide was dispersed in 100 ml of deionized water to obtain a graphene oxide dispersion the concentration of which was 6 mg/ml. 0.56 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.01 MPa, the liquid crystal solution was fed into container 4 containing a calcium chloride coagulation bath (an aqueous solution of calcium chloride in a concentration of 5 wt %) by splitters 3 (the number of which is three and each of which has 10 outlets having a diameter of 3 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres.

EXAMPLE 6

(1) Graphene oxide was dispersed in 100 ml of deionized water to obtain a graphene oxide dispersion the concentration of which was 8 mg/ml. 0.80 g of potassium hydroxide were added to the graphene oxide dispersion, and ultrasonically dispersed for 5 min to form a liquid crystal solution of graphene oxide.

(2) The liquid crystal solution of graphene oxide was placed in slurry supply apparatus 2. While slurry supply apparatus 2 was pressurized by pressure supply apparatus 1 to a pressure of 0.01 MPa, the liquid crystal solution was fed into container 4 containing a calcium chloride coagulation bath (an aqueous solution of calcium chloride in a concentration of 5 wt %) by splitters 3 (the number of which is three and each of which has 10 outlets having a diameter of 2 mm). After a standstill of 10 min, graphene oxide microspheres sank to the bottom of container 4. After the calcium chloride coagulation bath was discarded, a large amount of deionized water was added to container 4 to wash the sediment.

(3) The graphene oxide microspheres were placed into a solution of sodium ascorbate (4 g/L), and reacted at 80° C. for 10 hr, resulting in wet gel microspheres of graphene.

(4) The wet gel microspheres of graphene were immersed and washed with an aqueous solution of ethanol (1 wt %) for 24 hr, frozen at −20° C. for 10 hr, thawed at 25° C., and then dried at 30° C. for 24 hr, resulting in graphene aerogel microspheres.

The present disclosure is not limited to the embodiments described above. Any modification, improvement, and replacement which do not depart from the essence of the present disclosure and which those skilled in the art are able to think of fall within the scope of the present disclosure.

What is claimed is:

1. A method for continuously producing graphene aerogel microspheres, which comprises:
   (1) mixing graphene oxide and water to form a graphene oxide dispersion the concentration of graphene oxide in which is 3-20 mg/ml, mixing the dispersion and an alkali metal hydroxide, and ultrasonically dispersing the mixture to obtain a liquid crystal solution of graphene oxide;
   (2) placing the liquid crystal solution into a slurry supply apparatus, and pressurizing the slurry supply apparatus by a pressure supply apparatus while feeding the liquid crystal solution into a calcium chloride coagulation bath by a splitter, to obtain graphene oxide microspheres after a standstill of 5-30 min;
   (3) placing the graphene oxide microspheres into a solution of sodium ascorbate, and letting the reaction proceed at 60-90° C. for 5-25 hr, to obtain wet gel microspheres of graphene; and
   (4) treating the wet gel microspheres of graphene to obtain graphene aerogel microspheres.

2. The method according to claim 1, wherein in step (1), the concentration of graphene oxide in the graphene oxide dispersion is 5-10 mg/ml, and the alkali metal hydroxide is 0.1-3 wt % of the weight of the graphene oxide dispersion.

3. The method according to claim 1, wherein in step (1), ultrasonically dispersing the mixture continues for 3-15 min.

4. The method according to claim 1, wherein in step (2), the slurry supply apparatus is pressured by the pressure supply apparatus to a pressure of 0.01-0.05 MPa.

5. The method according to claim 1, wherein in step (2), the number of the splitters is two or more, the splitter has two or more outlets, and the outlet has a diameter of 1-5 mm.

6. The method according to claim 1, wherein in step (2), the calcium chloride coagulation bath includes an aqueous solution of calcium chloride the concentration of which is 1-8 wt %.

7. The method according to claim 1, wherein in step (3), the concentration of sodium ascorbate in the solution of sodium ascorbate is 3-15 g/l.

8. The method according to claim 1, wherein in step (4), treating the wet gel microspheres of graphene comprises a washing step in which the wet gel microspheres of graphene are washed with an aqueous solution of ethanol the concentration of which is 0.5-10 wt %, for 10-36 hr to obtain washed microspheres.

9. The method according to claim 8, wherein in step (4), treating the wet gel microspheres of graphene further comprises a freezing step in which the washed microspheres are frozen at −10° C. to −40° C. for 5-15 hr, and thawed at 15-35° C. to obtain thawed microspheres.

10. The method according to claim 9, wherein in step (4), treating the wet gel microspheres of graphene further comprises a step of drying under atmospheric pressure in which the thawed microspheres are dried under atmospheric pressure and at 25-60° C.

* * * * *